United States Patent
Azam et al.

(10) Patent No.: US 8,812,746 B2
(45) Date of Patent: Aug. 19, 2014

(54) DYNAMICALLY CONFIGURABLE DEVICE HOST CONTROLLER

(75) Inventors: Asad Azam, Folsom, CA (US); Dhinesh Sasidaran, Seremban (MY)

(73) Assignee: Intel Corporation, Santa Clara, CA (US)

(*) Notice: Subject to any disclaimer, the term of this patent is extended or adjusted under 35 U.S.C. 154(b) by 191 days.

(21) Appl. No.: 12/970,343

(22) Filed: Dec. 16, 2010

(65) Prior Publication Data

US 2012/0159264 A1 Jun. 21, 2012

(51) Int. Cl.
*G06F 3/00* (2006.01)
*G06F 5/00* (2006.01)
*G06F 11/07* (2006.01)
*G06F 13/10* (2006.01)

(52) U.S. Cl.
CPC ............... *G06F 11/07* (2013.01); *G06F 13/10* (2013.01)
USPC .................................. 710/8; 710/16; 710/36

(58) Field of Classification Search
None
See application file for complete search history.

(56) References Cited

U.S. PATENT DOCUMENTS

| 6,189,050 B1* | 2/2001 | Sakarda ................... 710/18 |
| 7,349,719 B2* | 3/2008 | Buniatyan ................ 455/557 |
| 7,725,613 B2 | 5/2010 | Bhardwaj et al. |
| 2009/0024757 A1* | 1/2009 | Proctor .................. 709/232 |
| 2011/0113219 A1* | 5/2011 | Golshan et al. ......... 712/30 |

* cited by examiner

*Primary Examiner* — Zachary K Huson
(74) *Attorney, Agent, or Firm* — Blakely, Sokoloff, Taylor & Zafman LLP

(57) ABSTRACT

Embodiments of the invention are directed towards scalable and dynamically configurable (and reconfigurable) device host controller solutions for system platform controller hubs (PCH). Embodiments of the invention may include logic or modules to detect a device coupled to a common I/O port (alternatively referred to as a converged I/O port) of a host system and determine its device type. Said logic or modules may further load host controller firmware for the device type from a memory to a processing core, such that the processing core will execute the host controller firmware to enable data transfer between the device and the host system. Said processing core may be configured and reconfigured based on the device type connected to the associated common I/O port.

18 Claims, 5 Drawing Sheets

DYNAMICALLY CONFIGURABLE DEVICE HOST CONTROLLER

FIELD

Embodiments of the invention generally pertain to electronic computing devices and more specifically to scalable and dynamically configurable device host controllers for platform controller hubs.

BACKGROUND

A host controller manages the data transfer connection between a host computer system and a peripheral device (e.g., network devices, storage devices). In current computer systems, high speed peripheral devices are coupled to host computer systems via a static configuration and connectivity protocol with a dedicated input/output (I/O) port and a specifically designed host controller associated with that port. In order to provide system users the flexibility to connect a variety of peripheral device types, computer systems must include a separate port and host controller to provide for connectivity for each peripheral device type.

An I/O port that has been designated for a particular device type is hardwired as such. For example, a particular port may be configured specifically for Serial Advanced Technology Attachment (SATA) devices, and this port cannot subsequently support a Peripheral Component Interconnect Express (PCIe) device or a Universal Serial Bus (USB) device.

Common I/O (or alternatively "converged I/O") is a concept that enables flexibility in connecting any device to a standard connector regardless of the device type. This technology enables computer system manufacturers to include standard connectors for any type of peripheral device.

FIG. 1 is a block diagram of a prior art system utilizing a common I/O port. System 100 includes CPU 110, host bus 115, non-volatile BIOS storage 120, and host controllers 130-139. Said host controllers enable data transfer communication between peripheral device 160 and, for example, host hardware and software applications executed via CPU 110. In this prior art solution it is understood that, even with the flexibility provided by common I/O port 150, host controllers 130-139 must still be static dedicated hardware—i.e., dedicated to a specific downstream device type (e.g., the device type device 160 may be a SATA device and this will only be compatible with SATA host controller 131).

Thus, while multiple device types may be supported by common I/O port 150, a fixed set of separate host controllers needs to be utilized and multiplexed (via multiplexer 150) to support said multiple device types. This type of solution does not allow for re-use and detrimentally effects scalability—if a system is to include multiple common I/O ports to support connecting a plurality of peripheral devices to the system, the system would have to include corresponding instances of host controllers 130-139 and multiplexer 140 for each common I/O port.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention are directed towards scalable and dynamically configurable (and reconfigurable) device host controller solutions for system platform controller hubs (PCH). Embodiments of the invention may include logic or modules to detect a device coupled to a common I/O port (or alternatively "converged I/O" port) of a host system and determine its device type. Said logic or modules may further load host controller firmware for the device type from a memory to a processing core, such that the processing core will execute the host controller firmware to enable data transfer between the device and the host system. Said processing core may be configured and reconfigured based on the device type connected to the associated common I/O port.

Embodiments of the invention enable dynamic configuration and reconfiguration of any system peripheral device common I/O port interface depending on the type of device connected to it. For example, a common I/O port may accommodate devices consistent with Serial Advanced Technology Attachment (SATA) specifications (e.g., SATA Revision Specification 3.0 released May 27, 2009), Peripheral Component Interconnect Express (PCIe) specifications (e.g., PCI Express Base 2.0 specification released Jan. 15, 2007) or Universal Serial Bus (USB) specifications (e.g., USB 3.0 Specification released Nov. 12, 2008).

To enable these features, embodiments of the invention may utilize an embedded microcontroller/microprocessor core, converged I/O capability, and non-volatile memory. Said non-volatile memory may store firmware functions which may be customized for various types of device protocols (e.g., said non-volatile memory may include host controller BIOS for each supported device type).

Thus, it is understood that embodiments of the invention may dynamically configure a generic microcontroller or microprocessor core to perform particular host controller functions, thereby allowing for dynamic configurability of the number of device types and host controllers that may be supported by a common I/O port. Systems including embodiments of the invention may therefore include fully re-usable and efficiently scalable "plug and play" generic device ports.

Figure 2:
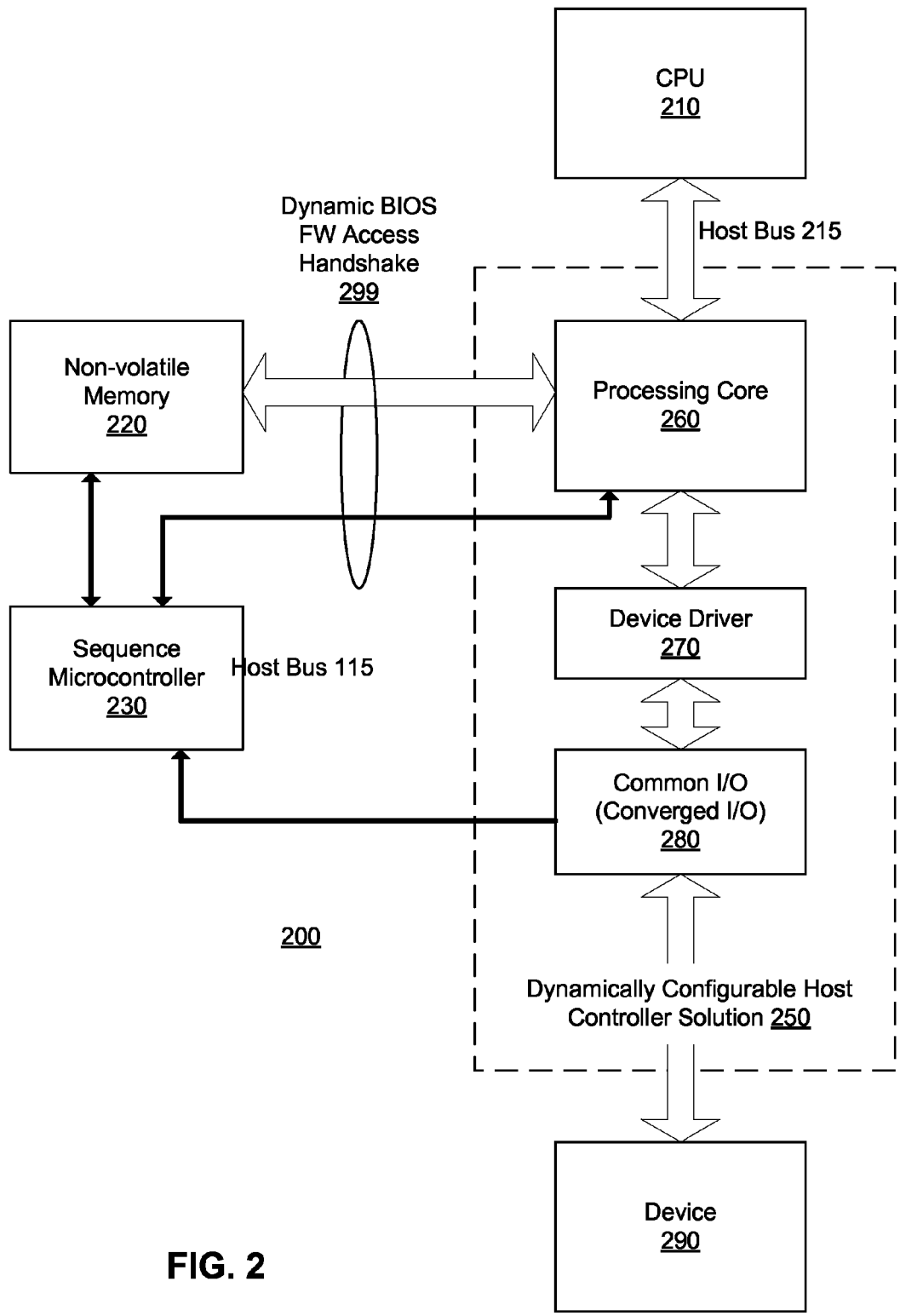
FIG. 2 is a block diagram of an embodiment of the invention.

FIG. 2 is a block diagram of an embodiment of the invention. Host system 200 includes central processing unit (CPU) 210, non-volatile storage memory 220, sequence microcontroller (alternatively referred to herein as a protocol configuration controller) 230 and dynamically configurable host controller solution 250.

In this embodiment of the invention, dynamically configurable host controller solution 250 includes processing core 260, device driver 270 and common I/O port (alternatively referred to herein as converged I/O port) 280. As discussed above, common I/O port 280 presumes that different peripheral device types will employ common connective means. Upon detection of device 290 at common I/O port 280, device type information may be forwarded to sequence microcontroller 230. It is to be understood that said device type information may be acquired through any means known in the art. For example, different device types may each have specific electrical characteristics that make each device type easily identifiable.

Sequence microcontroller 230 may schedule the loading of the associated host controller firmware (e.g., firmware BIOS) from non-volatile memory 220 to processing core 260 (shown in FIG. 2 as dynamic BIOS firmware access "handshake" 299). Presuming no errors occur in the loading of said host controller firmware, host controller solution 250 is thus dynamically configured to function as a host controller for device 290—i.e., to enable data transfer communication between peripheral device 290 and, for example, host hardware and software applications executed by CPU 210 via host bus 215. Thus, sequence microcontroller 230 configures processing core 260 into the protocol specific host controller required for device 290.

Figure 1:
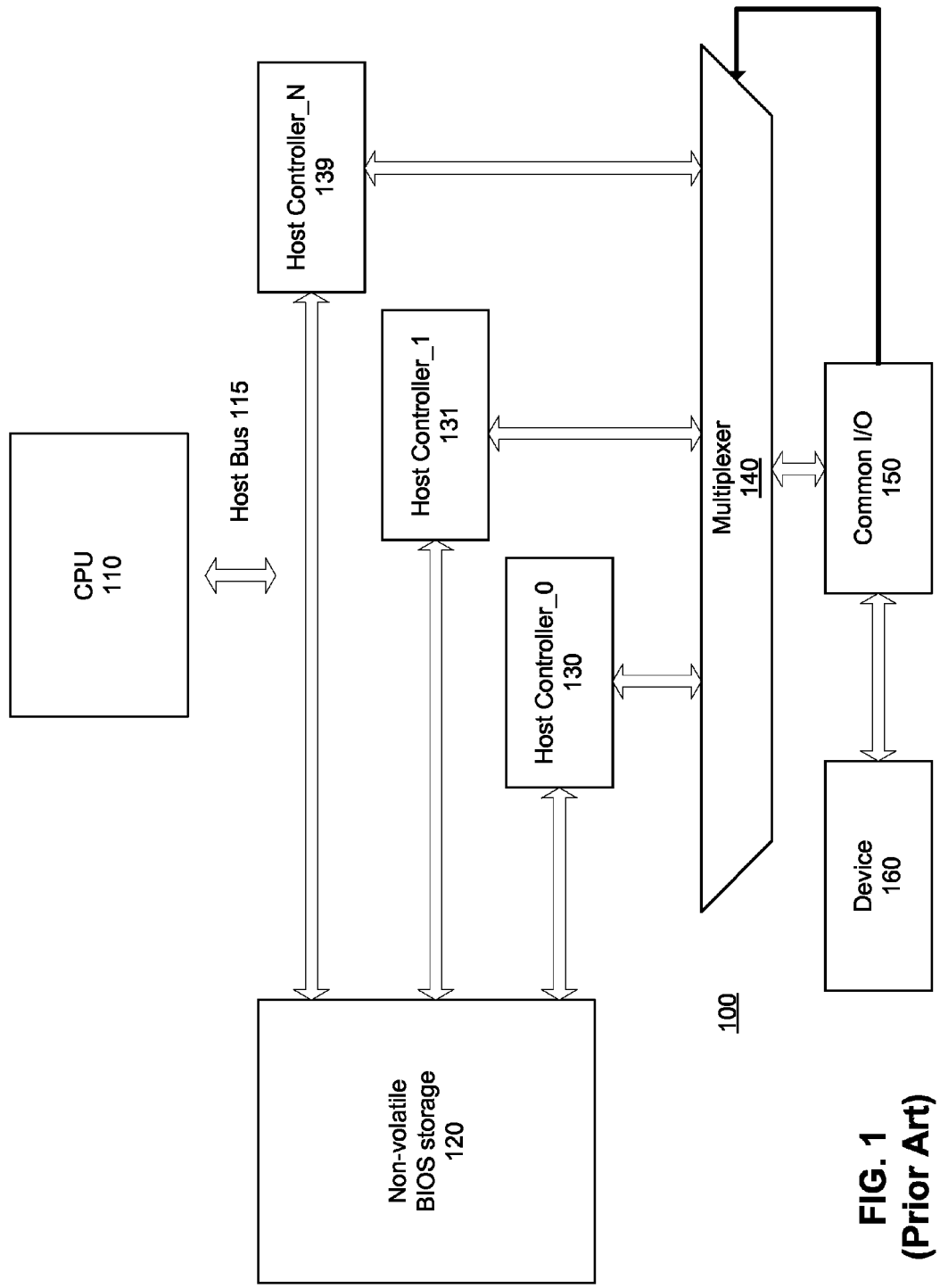
FIG. 1 is a block diagram of a prior art system utilizing a common I/O port.

It is to be understood that information transferred between peripheral device 290 and host system 200 is the same in this embodiment of the invention as it is in the prior art (e.g., FIG. 1). Furthermore, it is to be understood that once processing core 260 is loaded with the appropriate protocol specific BIOS, system 200 functions identically as system 100, but without the need to "MUX" a set of dedicated host controllers.

In one embodiment, the associated host controller firmware is loaded from non-volatile memory into volatile memory accessible by the appropriate processing core. Said processing core is then able retrieve the required functions and proceed to perform the required host controller functionality relative to the downstream device while the host system is active.

Thus, embodiments of the invention provide dynamic host controller functionality through the usage of a processing core that loads and executes device specific firmware required by the downstream device. For example, if a SATA device is plugged in to a system common I/O port, the microcontroller/microprocessor core that interfaces with the respective port is loaded with the necessary firmware to allow it to function as a SATA controller. If the SATA device is removed and a USB device is subsequently attached on the same common I/O port, then the USB protocol firmware is then loaded to said microcontroller/microprocessor core to allow it to function as a USB host controller.

Figure 3:
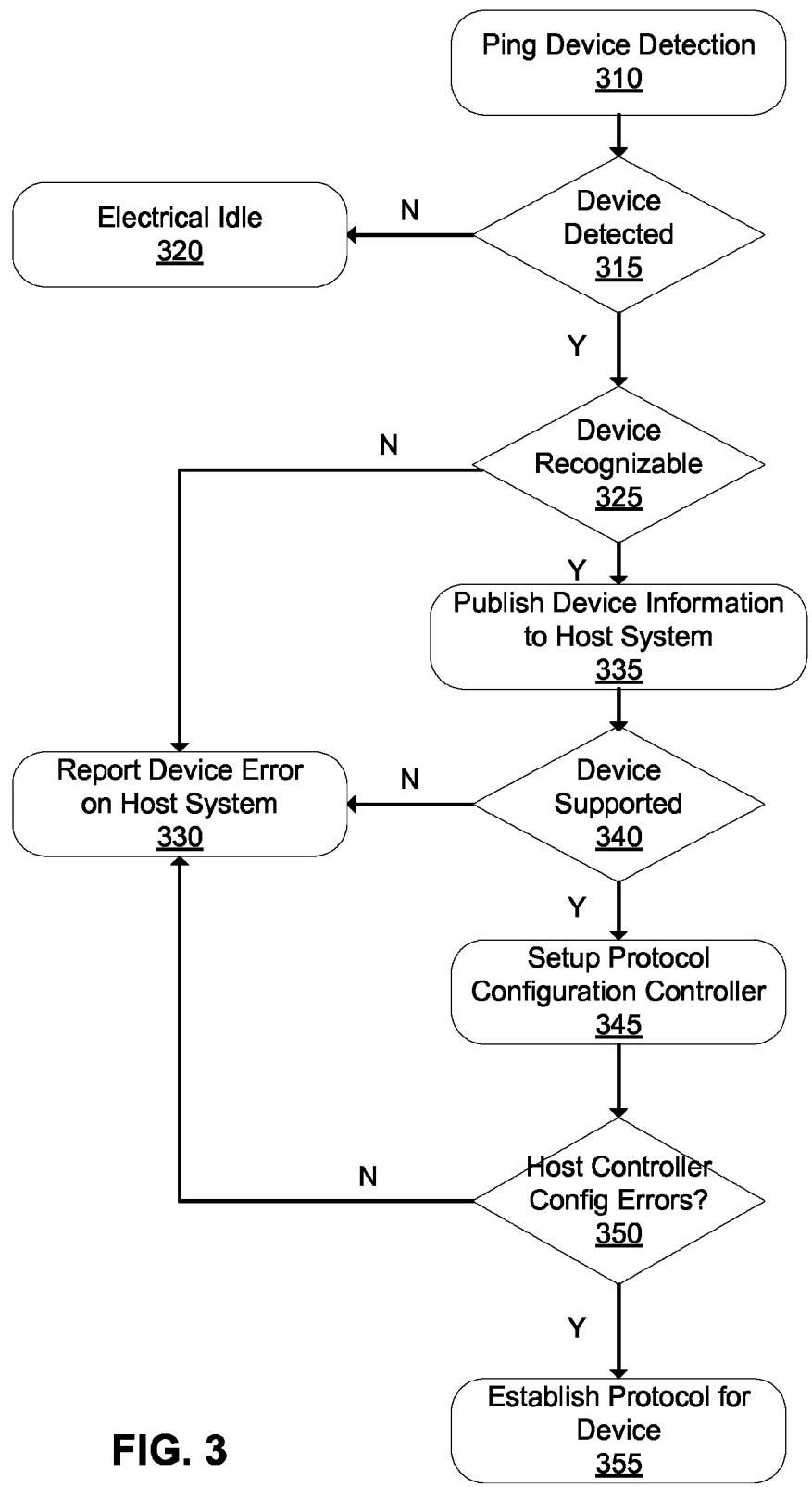
FIG. 3 is a flow diagram illustrating dynamic configuration of a host controller solution according to an embodiment of the invention.

FIG. 3 is a flow diagram illustrating dynamic configuration of a host controller solution according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

A device detection module or logic of a common I/O port included in a host system is pinged, 310, to determine if a device has been operatively coupled to the common I/O port, 315. If a device is not detected, the device detection module is placed in electrical idle, 320. If a device is detected, it is then determined if said device is recognizable, 325. If the device is not recognizable, an error is reported on the host system, 330. If the device is recognizable, then device identification information, including information indicating the device type, is forwarded to a protocol configuration controller, 335, in order to determine if the device is currently supported by the host system (i.e., if the host system has the host controller firmware to support the device type), 340. If the device is not supported, a host system error is reported, 330.

If the device is supported, then the protocol configuration controller is scheduled to load host controller firmware onto a processing core associated with the common I/O port, 345. If, during the loading of the firmware, 350, errors occur, then a host system error is reported, 330. Otherwise, data communication protocol is established between the host system and the device via the dynamically configurable host controller solution, 355.

It is to be understood that embodiments of the invention may be used to dynamically configure ports that are used for other platform devices (i.e., that are not end-user visible). For example, systems may include USB devices such as a fingerprint reader which are internally connected. In the prior art, the placement of these internally connected devices was restricted by the location of device type ports within the PCH. The flexibility allowed for by dynamically configuring each port controller according to embodiments of the invention increases the options for designing host system motherboards, and the placement of internally connected devices.

Furthermore, it is to be understood that embodiments of the invention allow for host controller firmware stored by the host system to be added, updated or replaced. Thus, a given number of processing cores may be placed on the PCH to be dynamically configured into a given number of host controllers to support a number of usage models without having to spin different silicon each time a new device type is to be supported.

Figure 4:
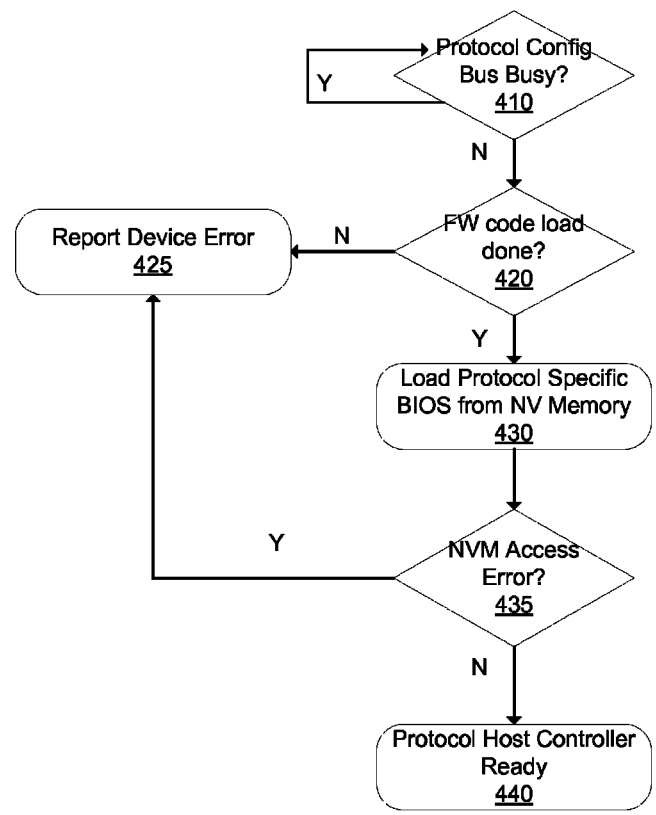
FIG. 4 is a flow diagram illustrating operations to load host controller firmware according to an embodiment of the invention.

FIG. 4 is a flow diagram illustrating operations to load host controller firmware according to an embodiment of the invention. In some embodiments a host system may include multiple common I/O ports, and thus a protocol configuration controller may be performing other operations when a peripheral device is detected. In the event that the protocol configuration controller is not busy, 410, firmware is attempted to be loaded to a processing core associated with the common I/O port coupling the peripheral device to the host system.

It is then determined if the firmware loaded properly to the processing core, 420. If loading the firmware was unsuccessful for any reason, then a device error may be reported to the host system, 425. Otherwise, protocol firmware (e.g., device specific BIOS) is loaded from non-volatile host memory to the associated processing core, 430. If non-volatile memory access errors occur, then a device error may be reported to the host system, 425. Otherwise the host controller is configured and therefore ready to enable data transfers to and from the device and the host system, 440. This configured and enabled state may be communicated to the system via a system interrupt, or any other functionally equivalent operation.

Figure 5:
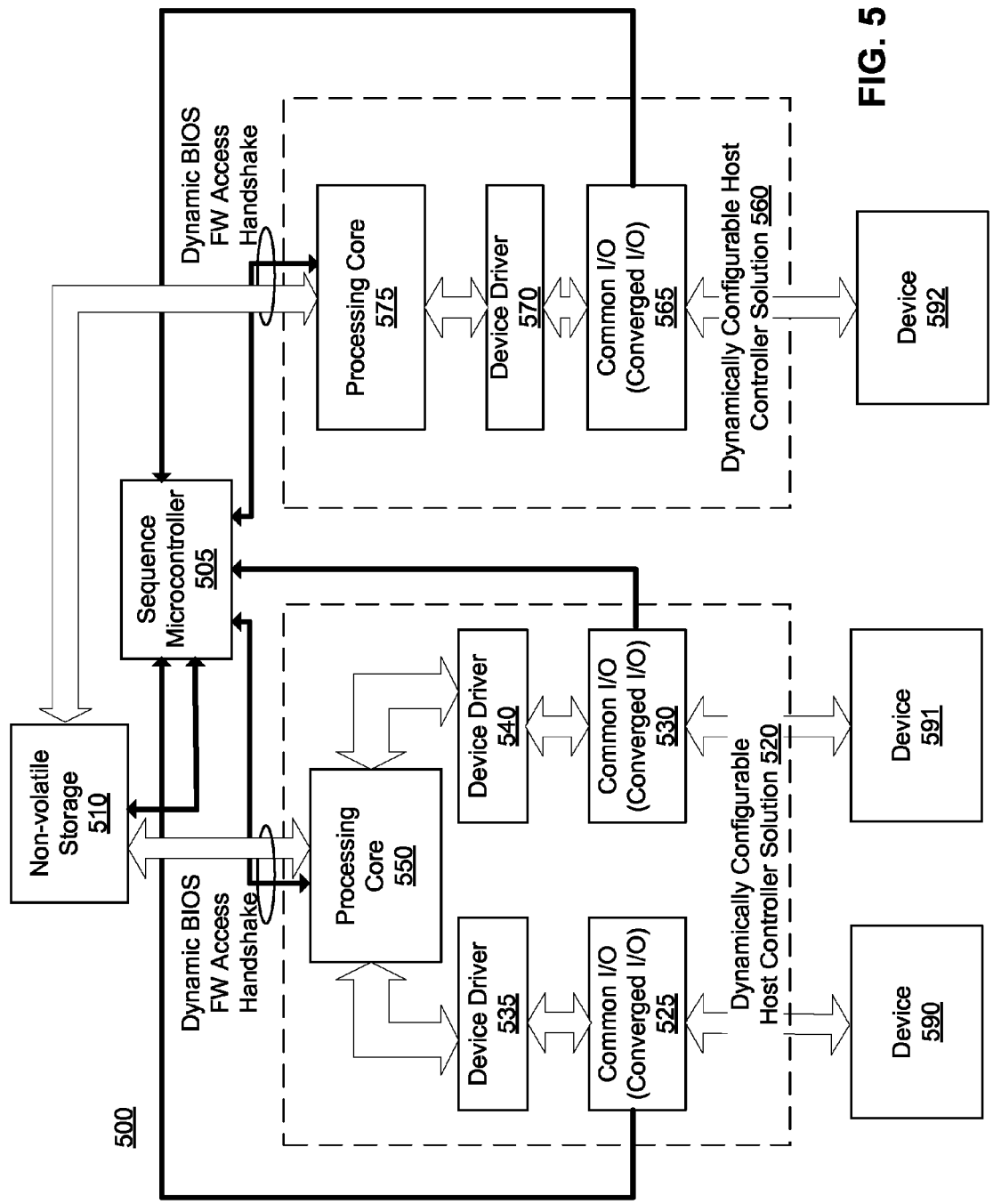
FIG. 5 is a block diagram of system including a plurality of common I/O ports according to an embodiment of the invention.

FIG. 5 is a block diagram of system including a plurality of common I/O ports according to an embodiment of the invention. In this embodiment, devices 590, 591 592 are operatively coupled to host system 500 via common I/O ports 525, 530 and 565 respectively. Device identification information for each device is forwarded to sequence microcontroller 505. In this example, devices 590 and 591 are the same device type (e.g., both are USB devices) and differ from the device type of device 592 (e.g., this device is a PCIe device).

Sequence microcontroller 505 schedules the loading of host controller firmware (stored in non-volatile memory storage 510) associated with USB device specifications to processing core 550. Thus, host controller solution 520 is dynamically configurable in that it is configured to execute USB host controller firmware upon detection of at least one of USB devices 590 and 591 coupled to common I/O ports 525 and 530 respectively. Host controller solution 520 is also dynamically scalable in that it is scaled to support both USB devices 590 and 591 to enable data communication between USB devices 590 and 591 and host system 500 via their related device drivers (device drivers 535 and 540 respectively). It is to be understood that this example configuration may be the result of coupling devices 590 and 591 to system 500 in any order (e.g., device 591 is coupled "last," and it is determined that processing core 550 may function as the host controller for said device).

Sequence microcontroller 505 may further schedule the loading of host controller firmware (stored in non-volatile memory storage 510) associated with PCIe device specifications to processing core 575. Thus, host controller solution 560 is dynamically configured to enable data communication between PCIe device 592 and host system 500 via its related device driver 570.

Thus, in this embodiment, it is possible for multiple devices of the same type to interface with the same processing core executing the associated device type host controller firmware. It is to be understood in some embodiments, processing cores 550 and 575 are not necessarily always assigned to ports 525, 530 and 565 (e.g., devices may be removed or added, and certain processing cores will have to be reconfigured). Furthermore, in alternative embodiments, each device coupled to a host system may have a dedicated configurable host controller solution (i.e., each device coupled to a host system may interface with separate dynamically configurable host controller solutions, each host controller solution including separate processing cores).

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. A computer readable non-transitory storage medium may also include a device or product having content stored thereon at a time of sale or delivery.

The invention claimed is:

1. A host computing device comprising:
   a non-volatile memory;
   a central processing unit (CPU);
   an input/output (I/O) port that supports multiple device protocols for coupling a peripheral device to the host computing device; and
   a configurable host controller to control host hardware and software applications executed by the CPU for enabling data transfers with the peripheral device, the configurable host controller comprising:
      a processing core; and
      logic to
         detect the peripheral device coupled to the I/O port of the host computing device,
         determine a device protocol of the peripheral device in response to detecting the peripheral device coupled to the I/O port of the host computing device,
         identify a device driver in response to determining the device protocol of the peripheral device, and
         load host controller firmware for the device protocol and the identified device driver from the non-volatile memory to the processing core of the configurable host controller, the processing core to execute the host controller firmware for the processing core to function as a host controller assigned to the peripheral device.

2. The host computing device of claim 1, the non-volatile memory to include host controller firmware for each of a plurality of device protocols.

3. The host computing device of claim 1, the logic to further:
   determine whether the non-volatile memory includes host controller firmware for the device protocol; and
   trigger a device error in response to determining the non-volatile memory does not include host controller firmware for the device protocol.

4. The host computing device of claim 1, further comprising:
   a second I/O port that supports multiple device protocols; and
   a second configurable host controller to control host hardware and software applications executed by the CPU for enabling data transfers with the second peripheral device, the configurable host controller comprising:
      a second processing core; and
      a second logic to further:
         detect a second peripheral device coupled to the second I/O port of the host computing device;
         determine a device protocol of the second peripheral device in response to detecting the second device coupled to the second I/O port of the host computing device;
         identify a second device driver in response to determining the device protocol of the second peripheral device; and load host controller firmware for the device protocol of the second device and the identified second device driver from the non-volatile memory to the second processing core of the second configurable host controller, the second processing core to execute the host controller firmware for the device protocol of the second device for the second processing core to function as a host controller assigned to the second peripheral device.

5. The host computing device of claim 4, wherein the processing core and the second processing core are both included in a multi-core processor dedicated to executing host controller firmware for a plurality of I/O ports of the system host computing device.

6. The host computing device of claim 1, further comprising a second I/O port that supports multiple device protocols, the logic to further detect a second peripheral device coupled to the second I/O port of the host computing device;

in response to detecting the second peripheral device coupled to the second I/O port, determine a device protocol of the second peripheral device is the same device protocol as the peripheral device coupled to the second I/O port; and identify a second device driver in response to determining the device protocol of the second peripheral device;

wherein the configurable host controller to further control host hardware and software applications of the host computing device for enabling data transfer between the second peripheral device and the host computing device.

7. An article of manufacture comprising a non-transitory machine-readable storage medium that provides instructions that, if executed by the machine, will cause the machine to perform operations comprising:

detecting a peripheral device coupled to an input/output (I/O) port that supports multiple device protocols of a host computing device;

determining a device protocol of the peripheral device in response to detecting the peripheral device coupled to the I/O port of the host computing device;

identifying a device driver in response to determining the device protocol of the peripheral device;

loading host controller firmware for the device protocol and the identified device driver from a memory to a processing core of a configurable host controller; and executing the host controller firmware via the processing core of the configurable host controller for the configurable host controller to function as a host controller for the peripheral device, wherein said host controller to control host hardware and software applications of the host computing device for enabling data transfer between the device and the host system computing device.

8. The article of manufacture of claim 7, the memory to include host controller firmware for each of a plurality of device protocols.

9. The article of manufacture of claim 7, the operations further comprising:

determining whether the memory includes host controller firmware for the device protocol; and triggering a device error in response to determining the memory does not include host controller firmware for the device protocol.

10. The article of manufacture of claim 7, the operations further comprising:

detecting a second peripheral device coupled to a second I/O port of the host computing device that supports multiple device protocols;

determining a device protocol of the second peripheral device in response to detecting the second peripheral device coupled the second I/O port of the host computing device;

identifying a second device driver in response to determining the device protocol of the second peripheral device;

loading host controller firmware for the device protocol of the second peripheral device and the identified second device driver from the memory to a second processing core of a second configurable host controller; and executing the host controller firmware for the device protocol of the second peripheral device via the second processing core of the second configurable for the host controller second configurable host controller to control host hardware and software applications of the host computing device for enabling data transfer between the second peripheral device and the host system computing device.

11. The article of manufacture of claim 10, wherein the processing core and the second processing core are both included in a multi-core processor dedicated to executing host controller firmware for a plurality of I/O ports of the host computing device.

12. The article of manufacture of claim 7, the operations further comprising:

detecting a second peripheral device coupled to a second I/O port of the host computing device that supports multiple device protocols;

determining a device protocol of the second peripheral device is the same device protocol as the peripheral device coupled to the I/O port of the host computing device in response to detecting the second peripheral device coupled to the second I/O port; and identifying a second device driver in response to determining the device protocol of the second peripheral device;

wherein executing the host controller firmware via the processing core is to further function as a host controller for both the device and the second device, and to further control host hardware and software applications of the host computing device for enabling data transfer between the second device and the host system computing device.

13. A method comprising:

detecting a peripheral device coupled to an input/output (I/O) port that supports multiple device protocols of a host computing device;

determining a device protocol of the peripheral device in response to detecting the peripheral device coupled to the I/O port of the host computing device;

identifying a device driver in response to determining the device protocol of the peripheral device;

loading host controller firmware for the device protocol and the identified device driver from a memory to a processing core of a configurable host controller; and executing the host controller firmware via the processing core of the configurable host controller for the configurable host controller to function as a host controller for the peripheral device, wherein said host controller to control host hardware and software applications of the host computing device for enabling data transfer between the device and the host computing device.

14. The method of claim 13, the memory to include host controller firmware for each of a plurality of device protocols.

15. The method of claim 13, further comprising:
determining whether the memory includes host controller firmware for the device protocol; and
triggering a device error in response to determining the memory does not include host controller firmware for the device protocol.

16. The method of claim 13, further comprising:
detecting a second peripheral device coupled to a second I/O port of the host computing device that supports multiple device protocols;
determining a device protocol of the second peripheral device in response to detecting the second peripheral device coupled the second I/O port of the host computing device;
identifying a second device driver in response to determining the device protocol of the second peripheral device;
loading host controller firmware for the device protocol of the second peripheral device and the identified second device driver from the memory to a second processing core of a second configurable host controller; and
executing the host controller firmware for the device protocol of the second peripheral device via the second processing core of the second configurable host controller for the second configurable host controller to control host hardware and software applications of the host computing device for enabling data transfer between the second peripheral device and the host computing device.

17. The method of claim 16, wherein the processing core and the second processing core are both included in a multi-core processor dedicated to executing host controller firmware for a plurality of I/O ports of the host computing device.

18. The method of claim 13, further comprising:
detecting a second peripheral device coupled to a second I/O port of the host computing device that supports multiple device protocols;
determining a device protocol of the second peripheral device is the same device protocol as the peripheral device coupled to the I/O port of the host computing device in response to detecting the second peripheral device coupled to the second I/O port; and
identifying a second device driver in response to determining the device protocol of the second peripheral device;
wherein executing the host controller firmware via the processing core is to further function as a host controller for both the device and the second device, and to further control host hardware and software applications of the host computing device for enabling data transfer between the second device and the host computing device.

* * * * *